(12) United States Patent
Pippert

(10) Patent No.: US 6,463,843 B2
(45) Date of Patent: Oct. 15, 2002

(54) PUMP LINER

(76) Inventor: Fredrick B. Pippert, 2514 Union Chapel St., Sugar Land, TX (US) 77479

( * ) Notice: Subject to any disclaimer, the term of this patent is extended or adjusted under 35 U.S.C. 154(b) by 0 days.

(21) Appl. No.: 09/789,889

(22) Filed: Feb. 21, 2001

(65) Prior Publication Data

US 2002/0073840 A1 Jun. 20, 2002

Related U.S. Application Data

(63) Continuation-in-part of application No. 09/330,448, filed on Jun. 11, 1999.

(51) Int. Cl.⁷ ................................................ F01B 11/02
(52) U.S. Cl. ....................................................... 92/170.1
(58) Field of Search ......................... 92/169.1, 169.2, 92/169.3, 170.1, 171.1

(56) References Cited

U.S. PATENT DOCUMENTS

| | | | | |
|---|---|---|---|---|
| 970,903 A | * | 9/1910 | Fennell | 91/171.1 X |
| 1,788,950 A | * | 1/1931 | Heiner | 92/171.1 |
| 2,094,254 A | * | 9/1937 | Brubaker | 92/169.1 |
| 3,678,811 A | | 7/1972 | Penwell | |
| 3,769,880 A | * | 11/1973 | Mirjanic | 92/169.2 |
| 3,880,055 A | * | 4/1975 | Nakamura et al. | 92/170.1 |
| 4,300,439 A | | 11/1981 | Degnan et al. | |
| 4,315,454 A | * | 2/1982 | Knobel | 92/170.1 |
| 4,389,921 A | * | 6/1983 | Bush | 92/170.1 X |
| 4,453,454 A | | 6/1984 | Comer | |
| 4,466,399 A | * | 8/1984 | Hinz et al. | 92/169.1 X |
| 4,516,479 A | | 5/1985 | Vadasz | |
| 4,603,062 A | | 7/1986 | Ecer | |
| 4,715,313 A | | 12/1987 | Ecer | |
| 4,746,554 A | | 5/1988 | Ecer | |
| 4,971,846 A | * | 11/1990 | Lundy | 92/170.1 |
| 5,061,159 A | | 10/1991 | Pryor | |
| 5,080,056 A | | 1/1992 | Kramer et al. | |
| 5,415,079 A | | 5/1995 | Ching | |
| 5,513,954 A | | 5/1996 | Bourgeois | |
| 5,617,773 A | | 4/1997 | Craft et al. | |
| 5,740,788 A | * | 4/1998 | Atmur et al. | 92/170.1 X |
| 5,829,405 A | | 11/1998 | Goedel | |
| 6,230,610 B1 | * | 5/2001 | Pippert | 92/170.1 |

FOREIGN PATENT DOCUMENTS

| | | | | |
|---|---|---|---|---|
| DE | 804387 | * | 4/1951 | 92/170.1 |
| FR | 2522082 | * | 8/1983 | 92/170.1 |

* cited by examiner

Primary Examiner—John E. Ryznic
(74) Attorney, Agent, or Firm—Browning Bushman P.C.

(57) ABSTRACT

A pump liner comprising a tubular sleeve having an inner sleeve surface formed of a corrosion- and abrasion-resistant material and an outer, frustoconical sleeve surface and a shell having an outer shell surface and an inner, frustoconical shell surface, the inner shell surface preferably being in interference engagement with the outer sleeve surface.

18 Claims, 3 Drawing Sheets

PUMP LINER

CROSS-REFERENCE TO RELATED APPLICATIONS

This application is a continuation-in-part of U.S. application Ser. No. 09/330,448, filed Jun. 11, 1999.

BACKGROUND OF THE INVENTION

1. Field of the Invention

The present invention relates to reciprocating pumps, such as pumps of the duplex or triplex type and, more specifically, to liners for use in such pumps.

2. Description of the Prior Art

In certain applications, corrosive or abrasive fluids (for example, oil well drilling fluid, commonly known as "mud"), must be pumped. Pumps used in these applications are reciprocating pumps typically of the duplex or triplex type provided with two or three cylinders, as the case may be, a piston being reciprocally disposed in each cylinder. Each cylinder communicates with a suction and discharge valve equipped chamber located at what is commonly referred to as the fluid end of the pump so that, as the piston is reciprocated by the piston rod, drilling fluid will be ultimately drawn into and discharged from the working chambers. Since the material pumped is of an abrasive character, and frequently corrosive as well, wear on the piston and cylinder wall is quite severe, and it has been common practice, in order to more easily repair a worn pump, to provide each cylinder with a replaceable steel liner that reciprocably supports the piston in the cylinder. Nevertheless, the abrasive fluid—e.g., mud—results in a relatively short lifetime of the liner and the piston, necessitating frequent replacement. It will be apparent that because of the abrasive nature of the fluids being pumped, the liner must have a hard interior surface. Additionally, because the pressures and forces that act on the liner are extreme, the liner is typically quite large and heavy.

Attempts to address the issue of making a liner that resists abrasion and corrosion and that is economical are numerous. As illustrated in U.S. Pat. No. 5,617,773, incorporated herein by reference for all purposes, the industry has generally settled on a dual-metal pump liner having an abrasive and corrosive-resistant inner sleeve and a machinable outer shell. One such liner is centrifugally cast, wherein a carbon steel outer shell is cast on the spinning mold and a high-chrome steel is then poured into the interior of a hot outer shell. Upon cooling, the result is a metallurgical bond between the inner sleeve and the outer shell, and the liner has a hard inner surface and a machinable outer surface. However, critical spinning speeds, pour temperatures, and other parameters make such a liner process expensive and the liners difficult to make. Another method that has been used in the manufacturing of liners is a shrink fit, wherein the carbon steel shell is heated and the high chrome sleeve is cooled. The two are then press-fitted together. Upon reaching a common temperature, the sleeve has expanded and the shell has shrunk, thus creating a tight fit. Still other attempts have been made at static casting the steel shell in the sleeve; however, that method was abandoned as a failure because the brittle sleeve tended to crack.

Thus, there remains a need for a pump liner that is corrosion- and abrasion-resistant, that can withstand the pressures and forces exerted on the liner, and that is lightweight to permit easier field installation.

In copending U.S. patent application Ser. No. 09/330,448, there is disclosed a pump liner wherein the shell is made of a composite material. As disclosed in the aforementioned U.S. patent application, the pump liners were constructed primarily by using the sleeve as a mandrel to form the shell around the sleeve in situ. While pump liners of this construction are suitable in certain applications, it has been found that in certain cases, and depending upon the construction of the pump liner, failure problems can occur. Specifically, it was noted that if the sleeve were made, as it frequently is, of a material exhibiting negligible elasticity, e.g., less than 1% elongation, the sleeve would fracture under the high pressures. In this regard, it is to be noted that most reinforcing fillers and/or materials used to form the composite shell present much greater elasticity, e.g., they exhibit elongation greater than 1%, and frequently 4 to 6%.

In mud pumps of the type under consideration, the pressures are quite high at the fluid end of the pump. Accordingly, regardless of the construction of the pump liner, e.g., whether or not the inner sleeve and the outer shell are both of metal and are essentially two separate pieces, provision must be made to ensure that the high pressures at the fluid end of the pump do not force the sleeve out of the shell.

SUMMARY OF THE INVENTION

It is therefore an object of the present invention to provide a pump liner that makes use of composites.

Another object of the present invention is to provide a pump liner that is lightweight relative to prior art pump liners.

The above and other objects of the present invention will become apparent from the drawings, the description given herein, and the appended claims.

In accordance with the present invention, there is provided a pump liner comprising a tubular sleeve having an inner corrosion- and abrasion-resistant sleeve surface and an outer sleeve surface, and a shell having an outer shell surface and an inner shell surface, the inner shell surface being in surface-to-surface engagement with the outer sleeve surface, the shell comprising a reinforcing filler supported in a polymeric matrix selected from the group consisting of thermoplastic resins, thermosetting resins, and mixtures thereof.

In accordance with another embodiment of the present invention, there is provided a pump liner comprising (i) a tubular sleeve having an inner sleeve surface of a corrosion- and abrasion-resistant material and an outer sleeve surface, the outer sleeve surface being frustoconical, and (ii) a shell in surrounding relationship to the tubular sleeve, the shell having an outer shell surface and an inner shell surface, the inner shell surface being frustoconical and complementary to the outer sleeve surface. In a preferred case, the outer sleeve surface and the inner shell surface are in interference engagement.

DESCRIPTION OF THE PREFERRED EMBODIMENTS

Figure 1:
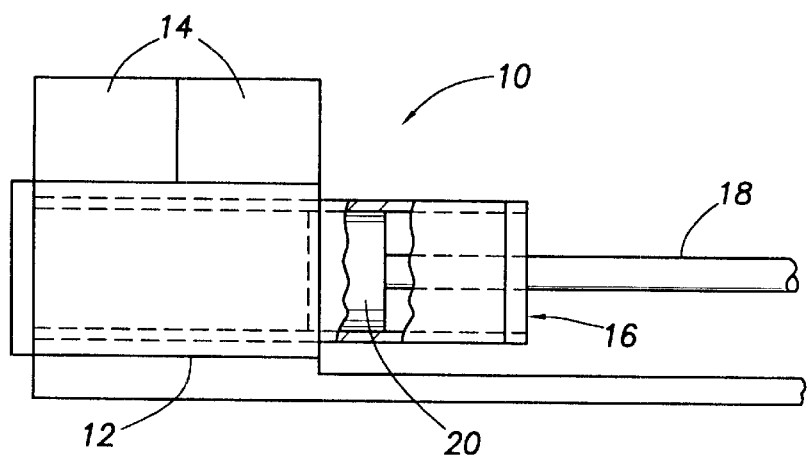
FIG. 1 is a simplified schematic diagram, partially in section, illustrating the pump liner of the present invention in operative position in a triplex mud pump.

With reference first to FIG. 1, there is shown a triplex mud pump 10 having a cylinder 12 communicating with valve-equipped intake and exhaust chambers 14, which in turn are connected with mud supply lines, not shown. The cylinder 12 is equipped with a sleeve-like liner 16 projecting at one open end outwardly of the cylinder 12 in the direction of a piston rod 18 connected with a piston 20 for reciprocation in the liner 16 and pumping of mud from a mud circulating pit to a drill string, neither of which are shown.

Figure 2:
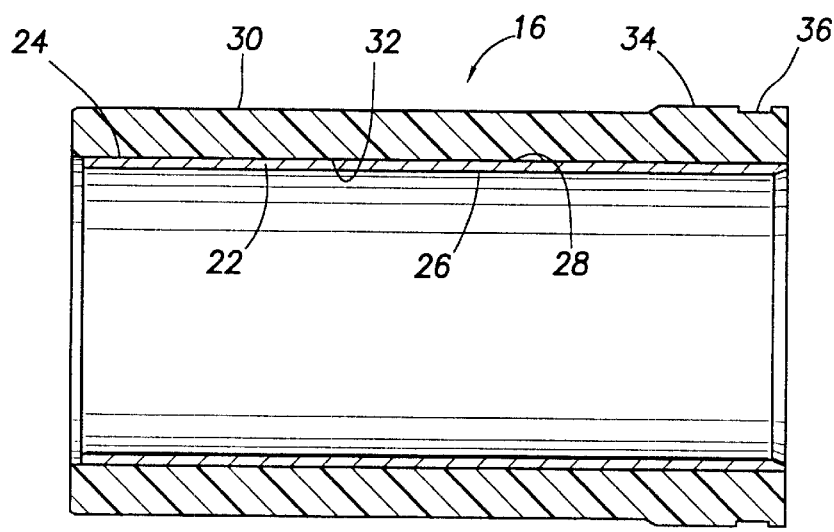
FIG. 2 is a sectional view taken through an axial radial plane of one embodiment of the pump liner of the present invention.

With reference now to FIG. 2, the pump liner 16 is seen to comprise a generally tubular, cylindrical body having an inner sleeve 22 and an outer shell 24. Inner sleeve 22 has an inner sleeve surface 26 that is corrosion- and abrasion-resistant and an outer sleeve surface 28, whereas shell 24 has an outer shell surface 30 and an inner shell surface 32. Pump liner 16 is constructed such that inner shell surface 32 is in positive, surface-to-surface contact with outer sleeve surface 28. As also seen, shell 24 has an upset portion 34 and an annular groove 36 that permit pump liner 16 to be adapted to the pump housing. The surface 26 of sleeve 22 must be of a material that is both abrasion- and corrosion-resistant. This can be accomplished by making sleeve 22 entirely of a material that possesses such properties. In this regard, typical materials that can be used include so-called white iron, which can contain alloying elements such as silicon, chromium, or nickel. For example, a cast sleeve of iron containing 23–28% chromium is frequently used as the sleeve in pump liners. Additionally, as disclosed in U.S. Pat. No. 4,746,554, incorporated herein by reference for all purposes, the sleeve can be comprised of a steel tube on the internal surface on which is applied a cladding that is abrasion- and corrosion-resistant. Examples of such cladding materials that can be used to form the inner corrosion- and abrasion-resistant surface of the sleeve include Stellite Alloy No. 1, Stellite Alloy No. 6, and Deloro 60, as well as various other metal oxides, borides, and carbides. Additionally, the entire sleeve can be made of a ceramic material such as a metal oxide, boride, or carbide.

Prior art pump liners use the sleeve as described above to provide the abrasion- and corrosion-resistant inner surface upon which the seal on the piston rides, while the shell is typically made of either a carbon steel or a low alloy steel that has sufficient wall thickness to resist the pressures and forces acting on the pump liner. Because of this construction, the pump liners of the prior art are quite heavy and difficult to manipulate in the field.

In the pump liner of the present invention, the shell is a composite comprised of a reinforcing filler supported in a polymeric matrix selected from the group consisting of thermoplastic resins, thermosetting resins, and mixtures thereof. As used herein, the term "composite" means a reinforcement, referred to herein as a filler, such as fibers or particles encapsulated in and/or supported by a suitable matrix or binder material such as a thermosetting and/or thermoplastic polymeric material. Generally speaking, composites of the type used herein have a discontinuous phase formed by the filler—e.g. fiber, particles, or the like—that is stiffer and stronger than the continuous matrix phase—e.g., the thermosetting or thermoplastic resin. Generally speaking, the filler will be present in the composite in an amount of 7% or greater. The fillers or reinforcements that make up the composite can be fibrous, laminar, or particulate in nature. The fiber reinforcements can in turn be divided into those containing discontinuous or continuous fibers or filaments. Fiber-reinforced composites contain fillers having lengths much greater than their cross-sectional dimensions. As noted, the fibrous filler can be of the discontinuous or continuous type, a discontinuous fiber being one in which its properties vary with its length. On the other hand, a continuous fiber or filament can be considered one in which, in general, any further increase in its length does not further increase certain physical properties, e.g., the elastic modulus. Continuous reinforcing fibers or fillers are available in many product forms ranging from monofilament to multifilament fiber bundles, and from unidirectional ribbons to single-layer fabrics and multi-layer fabric mats. Particulates are not generally useful as reinforcements in and by themselves but can be used with fiber fillers as reinforcements. Composites that are useful in the present invention are discussed in *Engineered Materials Handbook,* Vol. 1: *Composites,* ASM International, 1987, incorporated herein by reference for all purposes.

Non-limiting examples of fibrous fillers, be they discontinuous or continuous, include glass fibers, carbon fibers, aramid fibers, polybenzimidazole fibers, boron fibers, silicon carbide fibers, aluminum oxide fibers, graphite fibers, metallic fibers, etc.

In addition to a filler or reinforcement, the composites used in the pump liners of the present invention include, as a matrix or binder, a thermosetting resin, a thermoplastic resin, or mixtures thereof. Non-limiting examples of thermosetting resins include epoxy resins, bismaleimide resins, polyimide resins, phenolic resins, polyurethanes, etc., and mixtures thereof. Non-limiting examples of thermoplastic resins that can be used in the composites of the present invention include polyether etherketones, polyphenylene sulfides, polyetherimides, polyamideimides, polypropylenes, polyurethanes, etc., and mixtures thereof. It will also be appreciated that in certain cases it may be possible to use mixtures of thermoplastic and thermosetting resins, just as it is possible to use more than one type of filler or reinforcement in the composites used to make the pump liners of the present invention.

Returning to FIG. 2, shell 24, in one form, can be formed as a composite comprising windings of a suitable continuous filament coated or impregnated with a suitable thermosetting resin. For example, continuous filaments such as carbon fiber or glass fiber coated or impregnated with epoxy can be wound around sleeve 22 in successive layers until the desired radial thickness to form shell 24 is achieved. Following this, the pump liner blank can be cured to harden the epoxy matrix, following which the shell can be machined, for example, such that the upset 34 and groove 36 are formed. It will be appreciated that by using successive layers of windings as described above, a pump liner can be formed wherein the shell exhibits a very high hoop force to resist forces acting against and radially outward of the inner surface.

Figure 5:
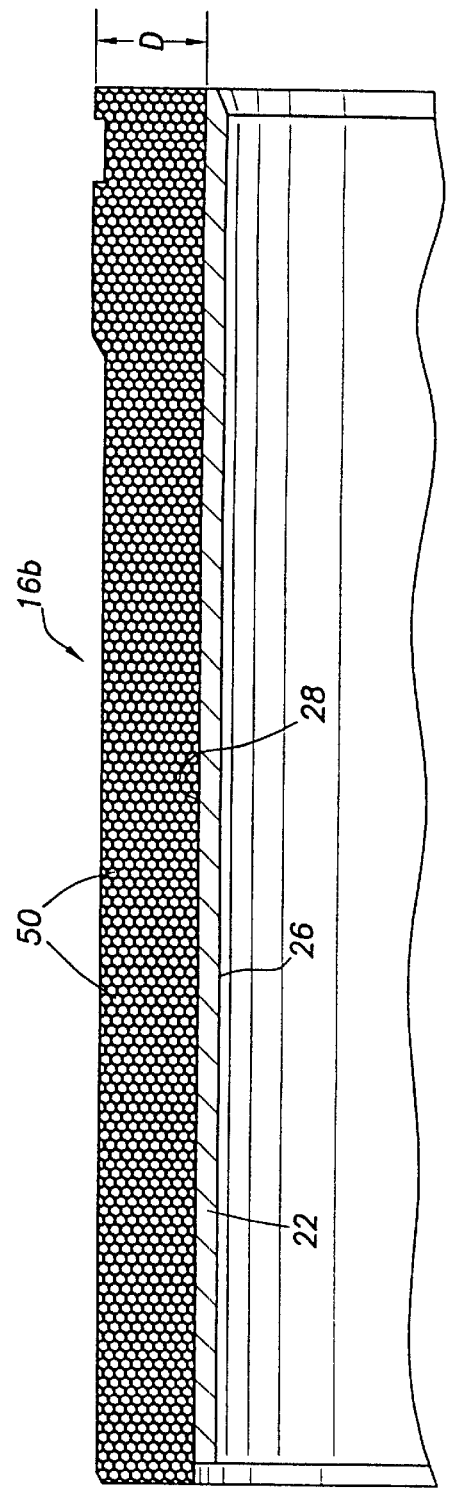
FIG. 5 is a view similar to FIG. 4 showing in detail another form of the composite shell of the pump liner of the present invention.

With reference to FIG. 5, there is shown an enlarged section of the pump liner of the present invention wherein continuous windings consisting of a suitable fibrous reinforcement have been wound around sleeve 22 to form successive layers, the layers being placed one upon the other until the desired radial thickness, indicated as D, has been achieved. It will be appreciated that the windings 50 are essentially surrounded by a suitable thermosetting or thermoplastic matrix such that the windings 50 in combination with the matrix essentially form a monolithic structure, the reinforcements or windings being primarily responsible for the structural strength, the matrix being responsible for bonding together the windings such that the shell retains its overall structural integrity.

Alternatively, the windings of a continuous filament such as a carbon fiber or glass fiber that has been coated or impregnated with a suitable thermosetting or thermoplastic resin can be wound in various other patterns around sleeve 22 again to the desired radial thickness, whereupon the pump liner blank can then be cured and the outer surface machined.

Figure 3:
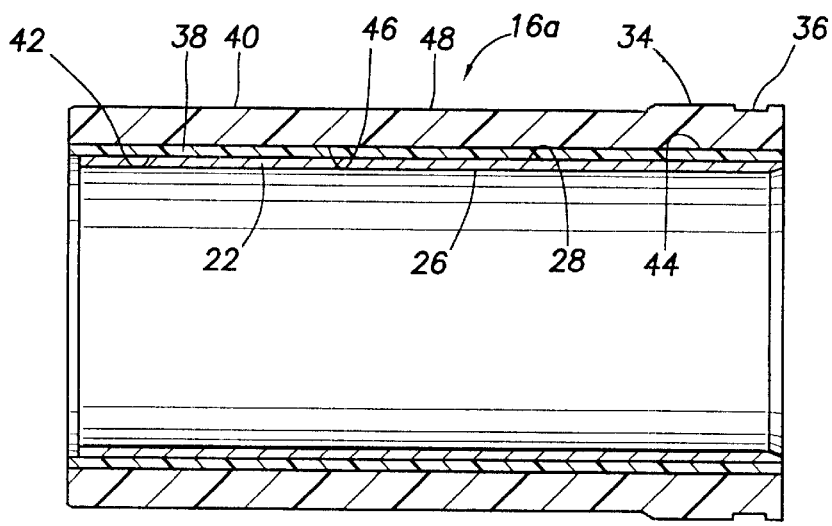
FIG. 3 is a view similar to FIG. 2 showing another embodiment of the pump liner of the present invention.

With reference now to FIG. 3, there is shown another embodiment of the pump liner of the present invention. In the embodiment shown in FIG. 3, the pump liner shown generally as 16a has a sleeve 22 as described above; but unlike the pump liner shown in FIG. 2, the outer shell is comprised of two concentric cylindrical portions, an innermost cylindrical portion 38, and an outermost cylindrical portion 40. As can be seen, the inner surface 42 of inner cylindrical portion 38 is in surface-to-surface contact with the outer surface 28 of sleeve 22, while the outer surface 44 of inner cylindrical portion 38 is in contact with the inner cylindrical surface 46 of second or outer cylindrical portion 40. The outer surface 48 of second cylindrical portion 40, as surface 30 in the pump liner shown in the embodiment in FIG. 2, can be machined to form the upset 34 and the recess 36. Pump liner 16a, in one embodiment, could be constructed such that first or inner cylindrical portion 38 is formed of a high modulus, continuous carbon filament using an epoxy matrix, while outer or second cylindrical portion 40 could be formed of a medium modulus continuous glass filament using an epoxy matrix. As described above with respect to the embodiments shown in FIGS. 2 and 5, the respective cylindrical portions 38 and 40 could be formed in a variety of ways. For example, both cylindrical portions 38 and 40 could be formed using windings of a continuous filament to form successive layers to achieve the desired radial thickness of cylindrical portion 38 or 40, as the case may be. Alternatively, one of the cylindrical portions—e.g., cylindrical portion 38—could be of layered windings, such as shown in FIG. 5, while the outer cylindrical portion 40 could be of windings of a continuous filament in a different form.

Figure 4:
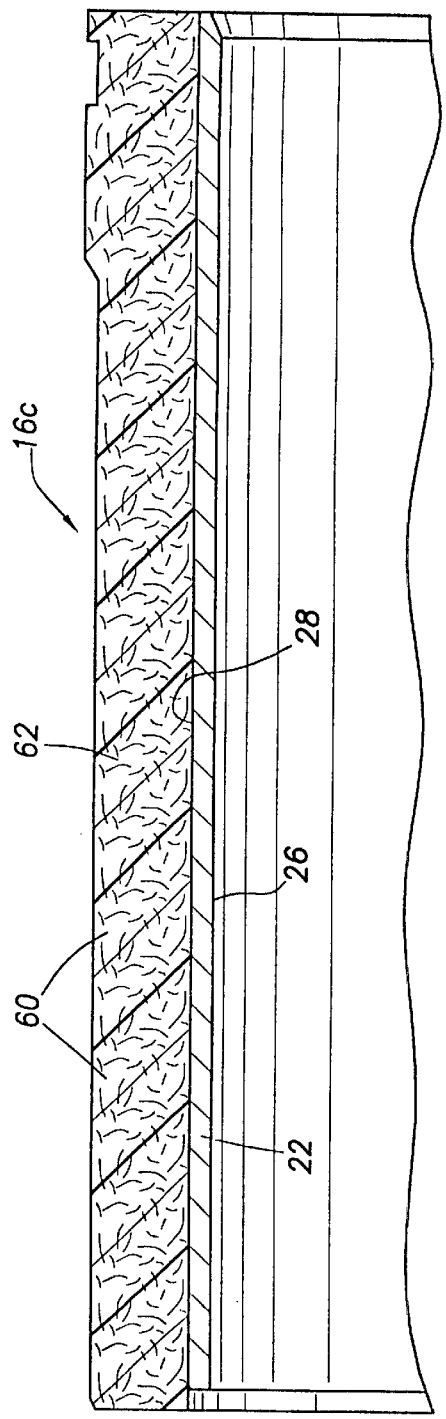
FIG. 4 is an enlarged sectional view similar to FIGS. 2 and 3 showing in greater detail one form of the composite shell of the pump liner of the present invention.

With reference to FIG. 4, the shell is shown as being comprised of discontinuous fibers 60 of a suitable material embedded in a suitable polymeric matrix 62, the discontinuous fibers 60 having a length to diameter ratio so as to provide structural integrity to the shell. Returning to the embodiment of FIG. 3, inner cylindrical portion 38 could be formed of windings, as shown in FIG. 5, to gain the requisite hoop force, while outer cylindrical portion 40 could be formed of discontinuous fibers in the manner shown in FIG. 4. And in still further variations, cylindrical proportions 38 and 40 could be formed in the manner shown in FIG. 4, cylindrical portion 38 using one type of discontinuous fiber and one type of thermosetting or thermoplastic resin, while outer cylindrical portion 40 is formed of a different discontinuous fiber and a different thermosetting or thermoplastic resin. It will be apparent that numerous variations of the various embodiments described with respect to FIGS. 2–5 can be employed.

In addition to windings of continuous filament fillers or reinforcements, the pump liners of the present invention could be formed by compression molding or ejection or transfer molding of a suitable composite around the inner sleeve. Such a composite could use discontinuous fibers in a suitable polymeric matrix. Additionally, a flowable thermosetting resin could be transferred into a fiber-packed mold and cured around the sleeve.

In a specific method of making the pump liner of the present invention, a continuous filament—e.g., carbon, glass, or the like—is coated or impregnated with a thermosetting resin such as an epoxy resin, the coated filament being wrapped around the inner sleeve to the appropriate outer dimension—i.e., radial thickness. This preform is then placed in an oven at the appropriate temperature for a specified time to achieve a full cure. Following cooling, the pump liner preform is machined to the appropriate dimensions to fit the appropriate pump.

In another specific technique that has been employed, a thermoplastic matrix has been employed. In this technique, a suitable continuous filament such as carbon, glass, or the like is coated or impregnated with a thermoplastic resin that has been heated so as to stay in a molten or flowable state while the continuous, coated filament is wrapped around the inner sleeve. Following cooling, the composite sets and the shell can be machined to its final dimension. It will also be apparent that the pump liner could be formed by first wrapping the sleeve with the appropriate reinforcement—e.g., a continuous fiber wound around to the desired thickness—to form a preform, which could then be placed into a mold and a thermoplastic or thermosetting resin added to the mold, which would then be cured in the appropriate fashion, depending upon whether the plastic matrix was thermosetting or thermoplastic in nature. Once the composite is cured, the outer surface of the shell could then be machined to the desired configuration and dimension. In this last method of forming the pump liner—more specifically, the shell—it will be appreciated that the filler is not coated or impregnated with the thermoplastic or thermosetting resin in the more conventional fashion wherein, for example, the continuous filament of the reinforcement is calendered through a bath of the resin and then wound around the sleeve. Nonetheless, the thermosetting or thermoplastic resin would still support the reinforcement, e.g., the continuous filament.

Figure 6:
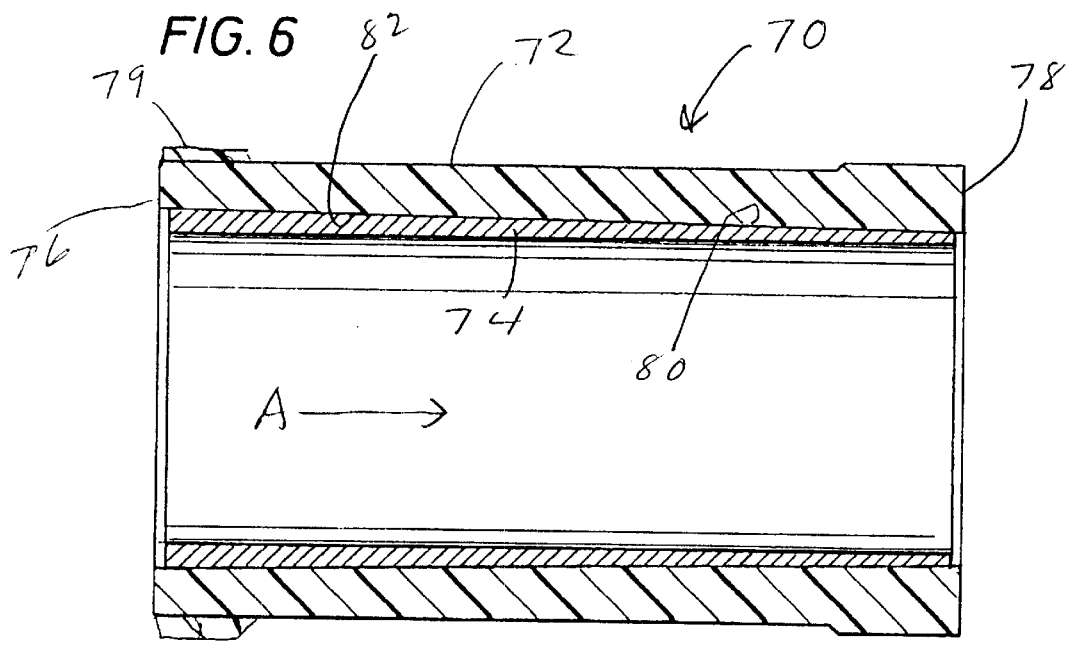
FIG. 6 is a view similar to FIG. 2 showing another embodiment of the pump liner of the present invention.

With reference now to FIG. 6, a pump liner according to the present invention, shown generally as 70, is seen to comprise a composite shell 72 in surrounding relationship to a sleeve 74, sleeve 74 being of metallic construction. Pump liner 70 has a first end 76 and a second end 78. Pump liner 70 is provided with an upset portion 79 adjacent the first end 76, which, as described above with respect to the other pump liners, permits pump liner 70 to be connected to a pump housing and, more specifically, to the fluid end of the pump. Rather than having a cylindrical outer surface as discussed above with respect to the other pump liner, sleeve 74 has a frustoconical surface 80, the largest diameter of which is located adjacent the first end 76 of pump liner 70. In like fashion, rather than having a cylindrical inner surface, shell 72 is provided with a frustoconical inner surface 82, the smallest diameter of which is located adjacent first end 76. As can be seen, frustoconical surfaces 80 and 82 are complementary to one another. More particularly, in a preferred embodiment, shell 72 is formed separately from sleeve 74 by any of the techniques discussed above or any other suitable technique, after which sleeve 74 is press-fitted into shell 72, sleeve 74 and shell 72 being dimensioned such that there is interference engagement between outer surface 80 of sleeve 74 and inner surface 82 of shell 72. The degree of interference engagement between the sleeve 74 and the shell 72 is dependent upon the respective materials from which the sleeve and shell are made; however, in general, the radial interference between sleeve 74 and shell 72 will be greater than about 0.001 inches, although greater radial interferences, e.g., 0.015 to 0.030 inches, are typically employed. By providing interference engagement between outer surface 80 and inner surface 82, sleeve 74 is subjected to what can be characterized as hoop stress exerted by shell 72, the hoop stress being sufficient to maintain a radially inward compressive force on sleeve 74, preventing its fracture when subjected to the high pressures normally encountered. It is also to be observed that any force exerted by hydraulic pressure from the fluid end of the pump—i.e., adjacent end 76 of pump liner 70—and that acts against sleeve 74 in the direction of arrow A will only serve to force frustoconical surfaces 80 and 82 into tighter engagement. Moreover, because of the engaged frustoconical surfaces 80, 82, it can be seen that hydraulic pressure from the fluid end of the pump cannot force sleeve 74 out of shell 72.

Figure 7:
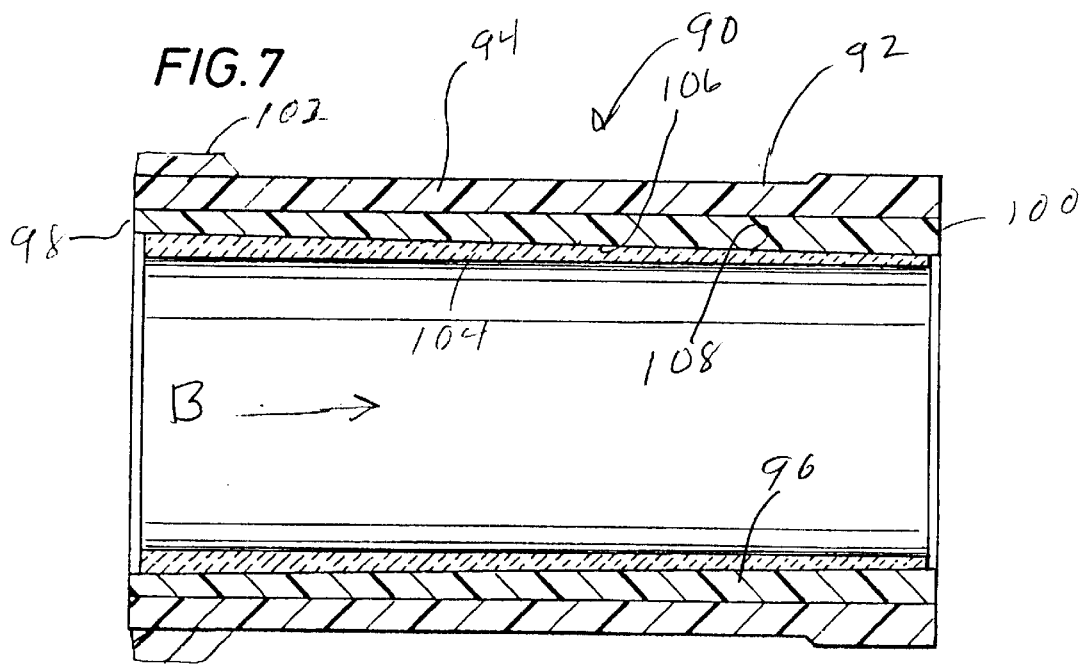
FIG. 7 is a view similar to FIG. 2 showing still another embodiment of the pump liner of the present invention.

With reference now to FIG. 7, there is shown a variation of the pump liner 70 shown in FIG. 6. Pump liner 90 is comprised of a shell 92 having a radially outermost portion 94 and a radially innermost portion 96, portions 94 and 96 being composite in nature as that term is used above. Pump liner 90 further includes a sleeve 104, shell 92 being in surrounding relationship to sleeve 104. Pump liner 90 further has a first end 98 and a second end 100, first end 98 being adapted be connected to the fluid end of the pump, an upset portion 102 being formed on outer shell portion 94 for this purpose. Whereas sleeve 74 in pump liner 70 is metallic in construction, sleeve 104 is of ceramic construction. As can be seen, radially innermost portion 96 of shell 92 has an inner surface 106 that is frustoconical, while sleeve 104 has an outer surface 108 that is likewise frustoconical and is complementary to frustoconical surface 106.

As described above with respect to pump liner 70, pump liner 90 is typically constructed by forming shell 92 as a separate piece and press-fitting sleeve 104 into shell 92, the dimensioning of shell 92 and sleeve 104 being such that surfaces 108 and 106 are in interference engagement. As in the case of pump liner 70, pump liner 90 provides a structure wherein the sleeve 104 can be made of a material possessing low elasticity but which nonetheless is prevented from fracturing even under high pressures because of the radially inwardly directed compressive force exerted by shell 92. Additionally, it can be seen that sleeve 104, when subjected to pressure in the direction of arrow B, is forced into even tighter engagement with shell 92 and is prevented from being expelled from shell 92 because of the engaged frustoconical surfaces 106 and 108.

While pump liners 70 and 90 have been described above with respect to an interference fit between the sleeves and the shells, it is to be understood that, depending upon the type of pressures to which the pump liner is subjected, the material of construction of the sleeve, and the material of construction of the shell, a true interference fit may not be necessary, albeit that the sleeves and the shells would have frustoconical surfaces for the purpose of preventing the sleeves from being dislodged from the shells. In such circumstances, the shell would exert no radially inward compressive force on the sleeve, albeit that the outer surface of the sleeve and the inner surface of the shell may be in surface engagement. Accordingly, for purposes herein, the term "interference" or "interference fit" is intended to mean a condition wherein because of relative dimensioning or otherwise, e.g., the application of some external force around the outer surface of the shells, there is a radially inwardly directed compressive force exerted by the shell on the sleeve. As noted above, this is most easily accomplished by dimensioning the sleeve and the shell such that the sleeve can be press-fitted into the shell under the exertion of a force that results in at least some degree of radially outward elastic deformation of the shell, resulting in a continuous radially inwardly directed compressive force on the sleeve. By achieving an interference fit between the sleeve and the shell, the sleeve can be constructed of materials that exhibit excellent corrosion and abrasion resistance but possess little or no elasticity. Non-limiting examples of such materials include chrome cast iron, ceramics, and the like.

It will be understood that the discussion herein regarding the composition of the composites is applicable to the embodiments of FIGS. 6 and 7, as well as the embodiments shown in FIGS. 2–5. Additionally, it will be appreciated that the sleeve of the embodiments shown in FIGS. 6 and 7 can be comprised of materials described above with respect to any of the embodiments shown in FIGS. 2–5. Lastly, the principles of construction of the pump liner shown in FIGS. 6 and 7 can be used wherein the sleeve and shell are both of metallic construction.

The term "support" as used herein, and with reference to the relationship between the filler/reinforcement and the polymeric matrix, is intended to encompass impregnation or coating of the filler prior to forming the shell, winding a matrix-free, continuous filament around the sleeve or a mandrel to the desired radial thickness, and then adding the polymeric matrix in a mold; filling a mold with discontinuous fibers, and then adding a suitable polymeric matrix, etc. In general, the word "support" is intended to encompass any structural relationship between the filler/ reinforcement and the polymeric matrix wherein the filler/reinforcement is essentially immobilized in the shell once the shell has been cured, whether the shell is formed in situ on the sleeve or separately from the sleeve. For example, in the embodiment shown in FIG. 5, where a continuous filament is wound around the sleeve in successive layers, it will be apparent that if the filament were coated with a thermosetting resin, the thermosetting resin would be in the interstices between the individual windings. Likewise, in a case where uncoated windings were layered around the sleeve or a mandrel to obtain the desired radial thickness, after which a thermoplastic or thermosetting resin were added as described above using a mold, the windings would be essentially immobilized, either by virtue of the fact that the polymeric matrix would permeate the interstices between the individual winding or, if full permeation were not achieved, sufficient permeation of the outermost layers of windings would occur such that the innermost, substantially uncoated windings would be essentially immobilized so as to provide the structural support necessary to withstand the pressures and forces acting upon the liner. Thus, the polymeric matrix can be considered a binder that tends to hold the shell together in a cohesive, structurally intact form.

It will be appreciated that with respect to the embodiments shown in FIGS. 2–5, the outer sleeve surface can be a smooth, cylindrical surface or, more preferably, can have formations that serve to grip the inner surface of the shell to prevent relative movement between the sleeve and the shell. Thus, for example, the outer surface of the sleeve could be provided with serrations, threads, or other such projections that would effectively mechanically grip the shell, preventing any relative rotation or longitudinal movement between the shell and the sleeve.

As noted above, one of the drawbacks of conventional pump liners that are used in mud pumps is their weight, and the concomitant difficulty is replacing the pump liners in the field. A conventional six-inch pump liner weighs approximately 130 to 140 lbs., whereas a pump liner of the same dimension made in accordance with the present invention would weigh approximately 40 to 50 lbs. The advantages of such a dramatic reduction in weight are obvious. Additionally, in conventional pump liners, while the inner sleeve is corrosion-resistant, the shell that is normally made of carbon steel is not corrosion-resistant. However, with the pump liners of the present invention, both the sleeve and the shell would be corrosion-resistant.

The foregoing description and examples illustrate selected embodiments of the present invention. In light thereof, variations and modifications will be suggested to one skilled in the art, all of which are in the spirit and purview of this invention.

What is claimed is:

1. A pump liner, comprising:
   a tubular sleeve having an inner sleeve surface of a corrosion- and abrasion-resistant material and an outer sleeve surface, said outer sleeve surface being frusto-conical; and
   a shell in surrounding relationship to said tubular sleeve, said shell having an outer shell surface and an inner shell surface, said inner shell surface being frustoconical and complementary to said outer sleeve surface, said shell comprising a composite comprising a reinforcing filler supported in a polymeric matrix selected from the group consisting of thermoplastic resins, thermosetting resins, and mixtures thereof, said shell and said sleeve being in press-fitted engagement with one another, the shell exerting a radially inwardly directed compressive force on the sleeve.

2. The pump liner of claim 1 wherein said shell is a composite comprising a reinforcing filler supported in a polymeric matrix selected from the group consisting of thermoplastic resins, thermosetting resins, and mixtures thereof.

3. The pump liner of claim 2 wherein said shell comprises a first, radially outermost portion defining said outer shell surface and a second, radially innermost portion defining said inner shell surface.

4. The pump liner of claim 3 wherein said first portion has a higher modulus than said second portion.

5. The pump liner of claim 3 wherein said first portion comprises windings of a first filament coated with a first thermosetting resin.

6. The pump liner of claim 5 wherein said second portion comprises windings of a second filament coated with a second thermosetting resin.

7. The pump liner of claim 5 wherein said first filament comprises a carbon fiber and said first thermosetting resin comprises an epoxy resin.

8. The pump liner of claim 6 wherein said second filament comprises a glass fiber and said second thermosetting resin comprises an epoxy resin.

9. The pump liner of claim 1 wherein said reinforcing filler comprises windings of a filament to achieve a desired radial thickness.

10. The pump liner of claim 1 wherein said filler comprises discrete segments of a fibrous material.

11. The pump liner of claim 1 wherein said filler is selected from the group consisting of carbon fibers, glass fibers, aramid fibers, polybenzimidazole fibers, boron fibers, silicon carbide fibers, aluminum oxide fibers, graphite fibers, metallic fibers, and mixtures thereof.

12. The pump liner of claim 1 wherein said thermosetting resin is selected from the group consisting of polyester resins, vinyl ester resins, epoxy resins, bismaleimide resins, polyimide resins, phenolic resins, polyurethanes, and mixtures thereof.

13. The pump liner of claim 1 wherein said thermoplastic resin is selected from the group consisting of polyether etherketone, polyphenylene sulfide, polyetherimide, polyamideimide, polypropylene, polyamides, polyurethanes, and mixtures thereof.

14. The pump liner of claim 1 wherein said sleeve is made entirely of a corrosion- and abrasion-resistant material.

15. The pump liner of claim 1 wherein said inner sleeve surface is formed of a layer of corrosion- and abrasion-resistant material on a metal, tubular substrate that is more susceptible to corrosion and/or abrasion, said outer sleeve surface being formed by said tubular substrate.

16. The pump liner of claim 1 wherein said outer sleeve surface and said inner shell surface are in interference engagement.

17. The pump liner of claim 14 wherein said sleeve comprises a metal.

18. The pump liner of claim 14 wherein said sleeve comprises a ceramic.

* * * * *